United States Patent
Carmo

(10) Patent No.: US 10,850,658 B2
(45) Date of Patent: Dec. 1, 2020

(54) TIE DOWN STRAP SYSTEM

(71) Applicant: Josh Carmo, Winnemucca, NV (US)

(72) Inventor: Josh Carmo, Winnemucca, NV (US)

( * ) Notice: Subject to any disclaimer, the term of this patent is extended or adjusted under 35 U.S.C. 154(b) by 12 days.

(21) Appl. No.: 16/270,993

(22) Filed: Feb. 8, 2019

(65) Prior Publication Data
US 2019/0291627 A1 Sep. 26, 2019

Related U.S. Application Data

(63) Continuation-in-part of application No. 29/673,115, filed on Dec. 12, 2018.

(60) Provisional application No. 62/648,111, filed on Mar. 26, 2018.

(51) Int. Cl.
| | |
|---|---|
| *B60P 7/08* | (2006.01) |
| *B60P 3/079* | (2006.01) |
| *B60R 9/10* | (2006.01) |
| *B62H 3/02* | (2006.01) |
| *B62H 3/00* | (2006.01) |
| *B60P 3/07* | (2006.01) |
| *B60R 9/00* | (2006.01) |
| *B60R 9/042* | (2006.01) |
| *B60R 9/08* | (2006.01) |
| *B60P 3/073* | (2006.01) |

(52) U.S. Cl.
CPC ........... *B60P 3/079* (2013.01); *B60P 3/07* (2013.01); *B60P 3/073* (2013.01); *B60P 7/0823* (2013.01); *B60P 7/0838* (2013.01); *B60R 9/00* (2013.01); *B60R 9/0426* (2013.01); *B60R 9/08* (2013.01); *B60R 9/10* (2013.01); *B62H 3/00* (2013.01); *B62H 3/02* (2013.01)

(58) Field of Classification Search
CPC .. B60P 3/079; B60P 3/07; B60P 3/073; B60R 9/00; B60R 9/0426; B60R 9/08; B60R 9/10; B62H 3/02; B62H 3/00
USPC ............... 410/9–12, 20–23, 50, 97, 100, 118
See application file for complete search history.

(56) References Cited

U.S. PATENT DOCUMENTS

| | | | |
|---|---|---|---|
| 4,842,458 A * | 6/1989 | Carpenter | B60P 7/083 410/103 |
| 6,715,972 B2 | 4/2004 | Jackson | |
| 6,932,550 B1 | 8/2005 | Hope | |
| 6,966,732 B2 * | 11/2005 | Gohata | B60P 3/079 410/100 |
| 7,632,051 B1 | 12/2009 | Abenroth | |
| 2006/0275094 A1 | 12/2006 | Shaw | |
| 2007/0196193 A1 * | 8/2007 | Hill | B60P 7/0823 410/23 |
| 2008/0226410 A1 | 9/2008 | Valkenburgh | |

* cited by examiner

*Primary Examiner* — Stephen T Gordon
(74) *Attorney, Agent, or Firm* — Boudwin Intellectual Property; Daniel Boudwin

(57) ABSTRACT

A tie down strap system is provided. The system includes a first flexible strap, a first hook disposed on the first flexible strap, a pair of adjusters disposed on the first flexible strap on each side of the first hook, a first connector attached to a first end of the first flexible strap, and a second connector attached to a second end of the first flexible strap. The system may be used to secure an item, such as a two-wheeled vehicle, to an object, such as a bed of a tow vehicle.

7 Claims, 4 Drawing Sheets

TIE DOWN STRAP SYSTEM

CROSS REFERENCE TO RELATED APPLICATIONS

This application claims the benefit of U.S. Provisional Application No. 62/648,111 filed on Mar. 26, 2018. Further, this application claims the benefit of U.S. Design patent application Ser. No. 29/673,115, filed Dec. 12, 2018. The above identified patent application is herein incorporated by reference in its entirety to provide continuity of disclosure.

BACKGROUND OF THE INVENTION

The present invention relates to a tie down strap system. More particularly, the present invention provides a strap with multiple connection points to increase the stability of items secured to a movable surface, such as a motorcycle in a truck bed.

When transporting a recreational motor vehicle, such as a motorcycle, dirt bike or all-terrain vehicle, in the bed of a truck, the recreational motor vehicle must be properly secured. A failure to properly secure a recreational motor vehicle could cause damage to the recreation motor vehicle, the vehicle transporting it, or a third party, such as a pedestrian or following automobile. Furthermore, improper securing of the recreational motor vehicle may cause harm to the driver or a passenger if a sudden stop or accident occurs. Therefore, there is a need for a tie-down strap system that will properly and effectively secure a recreational motor vehicle during transport.

Consequently, there is a need in for an improvement in the art of tie down strap systems. The present invention substantially diverges in design elements from the known art while at the same time solves a problem many people face when transporting motor vehicles. In this regard the present invention substantially fulfills these needs.

SUMMARY OF THE INVENTION

The present invention provides for a tie down strap system wherein the same can be utilized for providing convenience for the user when securing items to be transported.

The present tie down strap system includes a first flexible strap with a first connector attached to a first end thereof, and a second connector attached to a second end thereof. The system includes a first hook disposed on the first flexible strap between the first end and the second end, such that the first hook is configured to attach to an item, a first adjuster disposed on the first flexible strap between the first end of the first flexible strap and the first hook, and a second adjuster disposed on the first flexible strap between the first hook and the second end of the first flexible strap. The first connector and the second connector are configured to secure the tie down strap system to an object, such as a bed of a tow vehicle, such as a truck or a semi-truck. The first adjuster is configured to adjust a usable length of a portion of the first flexible strap between the first end and the first hook, and the second adjuster is configured to adjust a usable length of a portion of the first flexible strap between the first hook and the second end.

In some embodiments, a second flexible strap is attached to the first hook by a first end of the second flexible strap, and a second end of the second flexible strap is a third connector configured to connect to the item.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
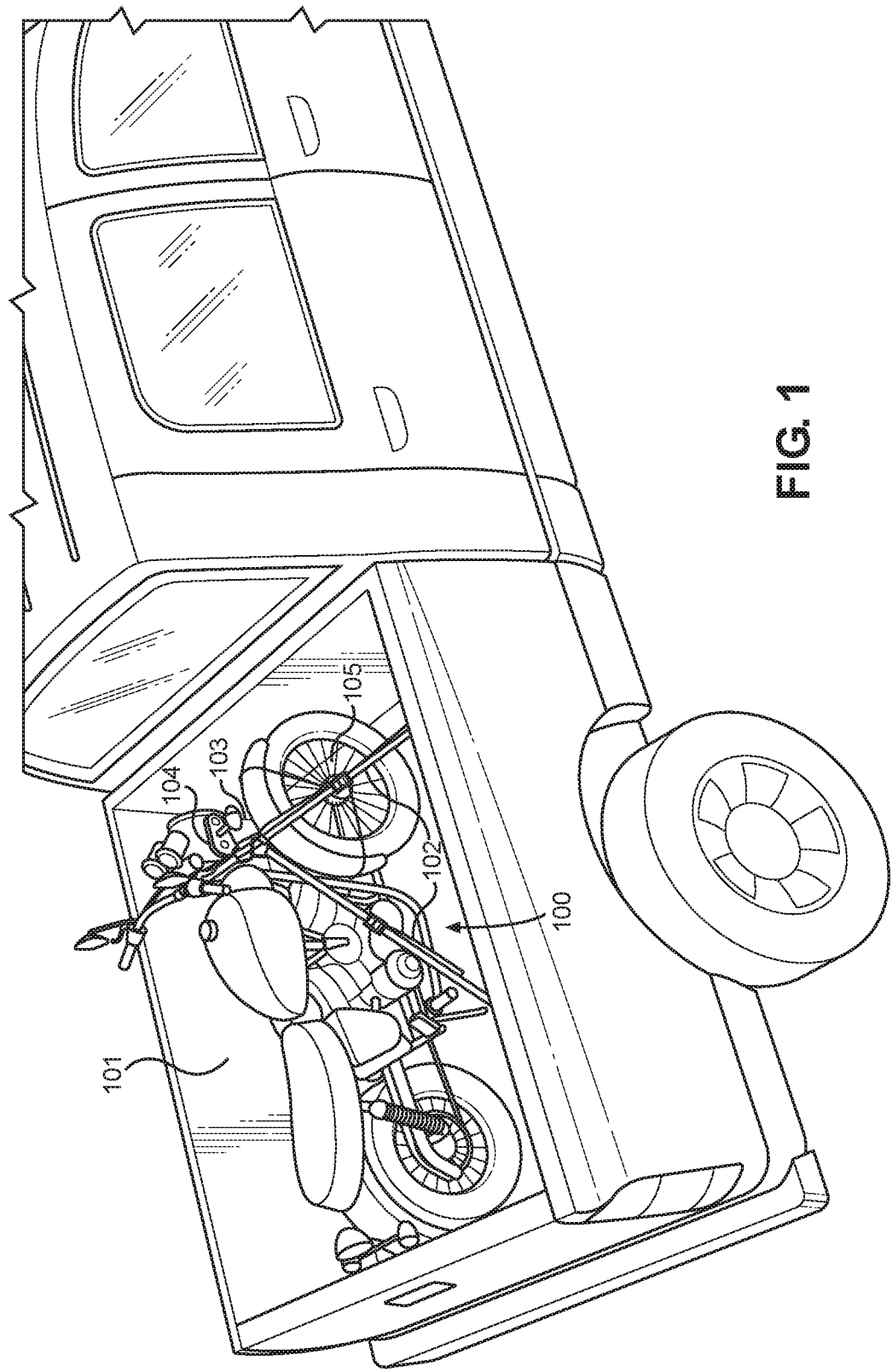
FIG. 1 shows a right-side view of a motorcycle attached in a bed of a pickup truck using an embodiment of the tie down strap system.

Reference is made herein to the attached drawings. Like reference numerals are used throughout the drawings to depict like or similar elements of the tie down strap system. For the purposes of presenting a brief and clear description of the present invention, a preferred embodiment will be discussed as used for tie down strap system. The figures are intended for representative purposes only and should not be considered to be limiting in any respect.

Referring now to FIG. 1, there is shown a right-side view of a motorcycle attached in a bed of a pickup truck using an embodiment of the tie down strap system. In the shown embodiment a motorcycle is depicted, however, the system may be used for any manner of item security or stability. The motorcycle 101 is shown as being secured or held in place by the strap system 100. The strap system 100 has a first flexible strap 102 and a first hook 103 disposed between a first and second end of the first flexible strap 102. In the shown embodiment, a second flexible strap 104 is attached to the first hook 103 and is configured to wrap around a handle bar of the motorcycle and attach to the first hook 103. One of ordinary skill in the art will understand that this is only a sample embodiment and that the strap can be configured to attach to any item that needs securing and that this strap is not limited to a handle bar. A first adjuster and a second adjuster, forming a pair of adjusters, are disposed along the first flexible strap 102 on either side of the first hook 103. The pair of adjusters may be cam buckles, rachets, sliding mechanisms, or any other means for adjustment of a usable length of a strap. Cam buckles enable a user to simply pull on an end of the first flexible strap not connected to the first hook 104, in order to tighten the first flexible strap 102 to secure the item in place. As can be seen, one connector is secured forward of the motorcycle, and a second connector is secured rearward of the motorcycle, thereby forming an A-frame attachment mechanism or scheme.

Figure 2:
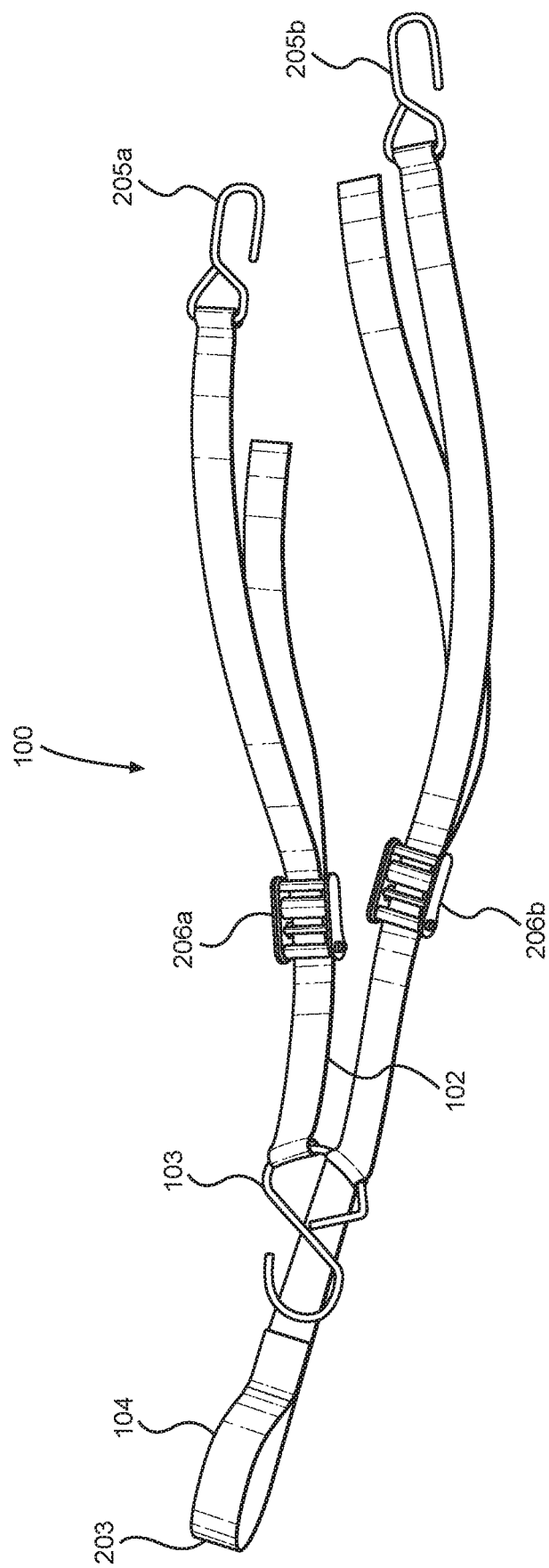
FIG. 2 shows a perspective view an embodiment of the tie down strap system.

Referring now to FIG. 2, there is shown a perspective view an embodiment of the tie down strap system. There is a first hook 103 that is connected to the first flexible strap 102 and the second flexible strap 104. The second flexible strap 104 is connected to the first hook 103 and has a second end 203 configured to be wrapped around an object to be secured and then attached to the first hook 103. Connectors 205a, 205b are depicted as positioned at the first and second ends of the first flexible strap, respectively. In the shown embodiment, hooks are used as the connectors 205a and 205b, but other connectors can be used. Adjusters 206a, 206b are depicted as positioned between the first end of the first strap 102 and the first hook 103 (206a), and as positioned between the first hook 103 and the second end of the first strap 102 (206b), respectively. In the shown embodiment, the first hook 103 includes a rounded portion, and a hook portion continuous with the rounded portion.

The first hook 103 and connectors (205a, 205b) can be coated with various materials including but not limited to, rubber, plastic, or various paints. All these coatings will ensure that the hooks and connectors do not rust or become weak and unusable. In one embodiment the hook is coated with rubber. This will also ensure that the hook stays in place and is secured to the truck bed. The coating on the first hook 103 and the connectors (205a, 205b) will also ensure that the hooks do not scratch or damage the bike.

Figure 3B:
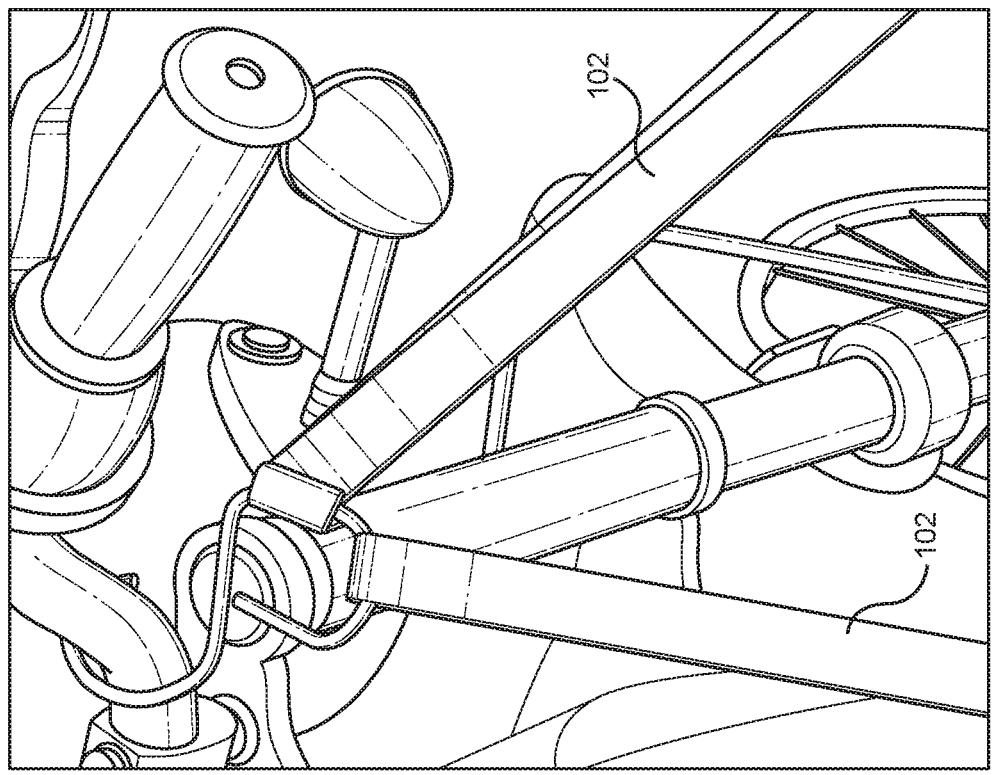
FIG. 3B shows a close-up perspective view of an embodiment of the tie down strap system using the hook to directly attach a first flexible strap of the system to the motorcycle.
Figure 3A:
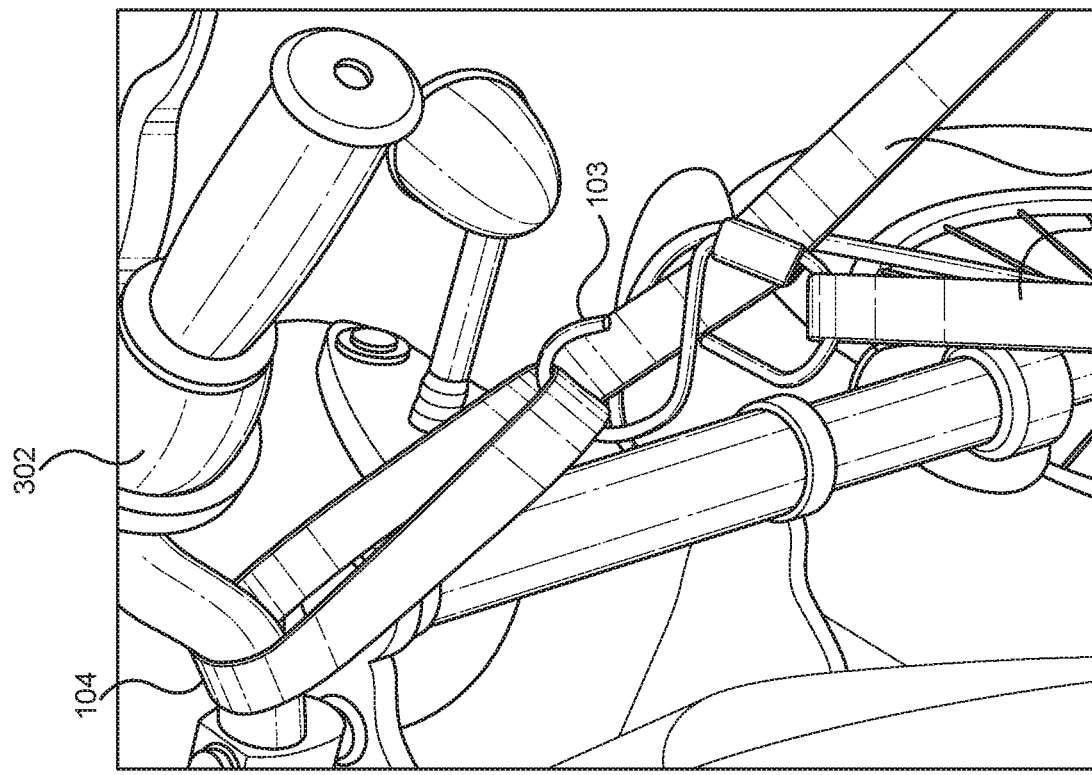
FIG. 3A shows a close-up perspective view of an embodiment of the tie down strap system using a second flexible strap attached to the hook.

FIG. 3A shows a close-up perspective view of an embodiment of the tie down strap system using a second flexible strap attached to the hook. The second flexible strap 104 is attached to the first hook 103. The second flexible strap 104 is wrapped around a handle bar 302 and attached to the first hook 103. In addition, in the shown embodiment, a part of the first flexible strap 102 is also connected to the first hook 103.

FIG. 3B shows a close-up perspective view of an embodiment of the tie down strap system using the hook to directly attach a first flexible strap of the system to the motorcycle. In this embodiment, the first hook is attached directly to the handle bar. In addition, a part of the first flexible strap 102 is connected to the first hook.

Figure 4:
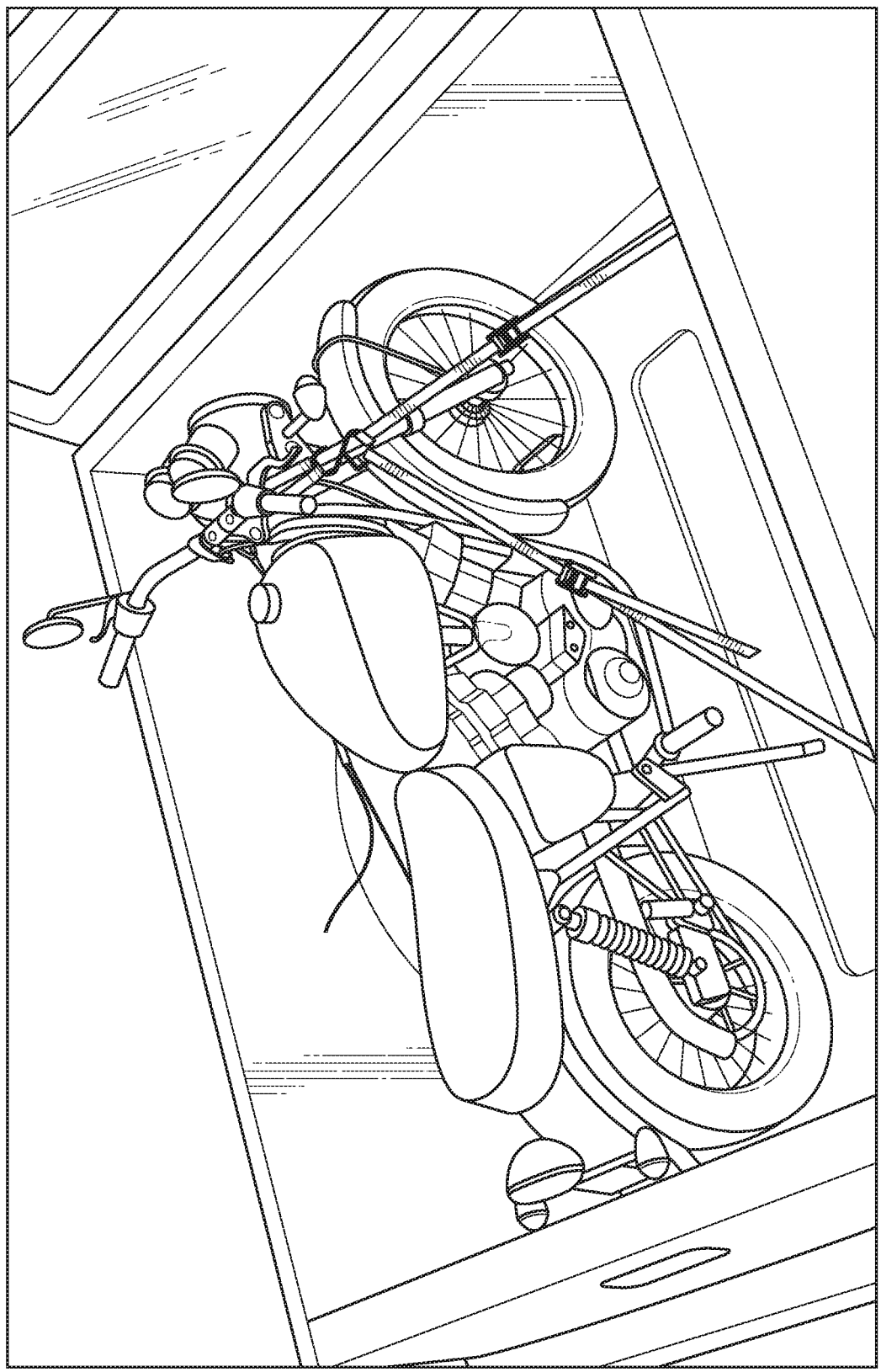
FIG. 4 shows a perspective view of the motorcycle strapped in the pickup truck using an embodiment of the tie down strap system.

FIG. 4 shows a perspective view of the motorcycle strapped in the pickup truck using an embodiment of the tie down strap system. In a particular embodiment, more than one system may be used to prevent the item from falling or tipping over during transport of the item. In the shown embodiment, a first system is connected to a first side of the motorcycle, and a second system is connected to a second side of the motorcycle. In this manner, a stability of the motorcycle is maximized, and the motorcycle will not tip over during transport in the bed of the truck.

In an embodiment when more than one strap is used there should be a strap on either side of the motorcycle. In this embodiment a first strap will be attached to the left side of the motorcycle and a second strap will be attached to the right side of the bike. The first strap will be attached in an A-frame configuration on the left side of the motorcycle. The first strap will be attached in an A-frame configuration on the right side of the motorcycle. The straps will pull the motorcycle in opposite direction keeping the bike upright in travel.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tie down strap system, comprising:
   a first flexible strap with a first connector attached to a first end thereof, and a second connector attached to a second end thereof;
   a first hook disposed on the first flexible strap between the first end and the second end, wherein the first hook is configured to attach to an item;
   a first adjuster disposed on the first flexible strap between the first end of the first flexible strap and the first hook;
   a second adjuster disposed on the first flexible strap between the first hook and the second end of the first flexible strap;
   wherein the first connector and the second connector are configured to secure the tie down strap system to an object;
   wherein the first adjuster is configured to adjust a usable length of a portion of the first flexible strap between the first end and the first hook;
   wherein the second adjuster is configured to adjust a usable length of a portion of the first flexible strap between the first hook and the second end.

2. The tie down strap system of claim 1, further comprising:
   a second flexible strap attached to the first hook by a first end of the second flexible strap;
   wherein a second end of the second flexible strap is a third connector configured to connect to the item.

3. The tie down strap system of claim 1, wherein the first and second adjusters are each cam buckles.

4. The tie down strap system of claim 1, wherein the first hook includes a rounded portion and a hook portion which is continuous with the rounded portion.

5. The tie down strap system of claim 1, wherein the hook is coated in a material selected from a group consisting of: a rubber, a plastic, and a combination thereof.

6. The tie down strap system of claim 1, wherein the item includes a two-wheeled vehicle.

7. The tie down strap system of claim 6, wherein the object includes a bed of a tow vehicle.

* * * * *